US005132911A

United States Patent [19]

Leader, Jr. et al.

[11] Patent Number: 5,132,911

[45] Date of Patent: Jul. 21, 1992

[54] APPARATUS FOR MOUNTING AND PROOFING PRINTING PLATES

[75] Inventors: Charles B. Leader, Jr., Napoleon; Gary L. Hammitt, Toledo, both of Ohio

[73] Assignee: Leader Engineering Fabrication, Inc., Napoleon, Ohio

[21] Appl. No.: 457,585

[22] Filed: Dec. 27, 1989

[51] Int. Cl.[5] .......... B41B 11/00; H04N 7/18

[52] U.S. Cl. .......... 364/469; 101/DIG. 36; 358/107; 33/618; 33/621

[58] Field of Search .......... 364/167.01, 469, 519; 358/101, 106, 107; 33/614-621; 101/401.1, 401.3, 415.1, 382.1, 212, 216, 383, 485, DIG. 36, 186

[56] References Cited

U.S. PATENT DOCUMENTS

| | | | |
|---|---|---|---|
| 3,616,055 | 10/1971 | Mages | 156/384 |
| 3,679,316 | 7/1972 | Boujon | 356/168 |
| 3,941,486 | 3/1976 | Tyler | 356/172 |
| 4,004,509 | 1/1977 | Moss | 101/216 |
| 4,033,259 | 7/1977 | Schuhmann | 101/174 |
| 4,449,452 | 5/1984 | Mansell | 101/382 |
| 4,484,522 | 11/1984 | Simeth | 364/469 |
| 4,489,652 | 12/1984 | Takeuchi et al. | 101/DIG. 36 |
| 4,520,389 | 5/1985 | Hornschuh | 101/DIG. 36 |
| 4,589,338 | 5/1986 | Collins et al. | 101/DIG. 36 |
| 4,611,539 | 9/1986 | Ireton | 101/DIG. 36 |
| 4,705,590 | 11/1987 | Vandenberg | 156/447 |
| 4,858,528 | 8/1989 | Inouye et al. | 101/485 |
| 4,872,407 | 10/1989 | Banke | 101/DIG. 36 |
| 4,925,506 | 5/1990 | Baker | 33/618 |
| 5,031,334 | 7/1991 | Takamura | 101/DIG. 36 |

*Primary Examiner*—Jerry Smith
*Assistant Examiner*—Thomas E. Brown
*Attorney, Agent, or Firm*—Marshall & Melhorn

[57] ABSTRACT

An apparatus for mounting flexible printing plates on a printing cylinder includes a base rotatably supporting a printing cylinder in a predetermined position and an adjacent support table having a surface for supporting a flexible printing plate having a reference point thereon. Actuators move the support table along three orthogonal axes one of which is parallel to the longitudinal axis of the printing cylinder. The position of the reference point is sensed by a video camera and feedback signals representing the positions of the camera and the table with respect to the three axes are inputs to a computer. The computer determines the positional relationship between the reference point on the printing plate and the predetermined position of the printing cylinder and moves the support table to position the printing plate at a desired position for mounting on the printing cylinder.

5 Claims, 6 Drawing Sheets

APPARATUS FOR MOUNTING AND PROOFING PRINTING PLATES

BACKGROUND OF THE INVENTION

The present invention relates generally to an apparatus for mounting printing plates and, in particular, to an apparatus for mounting flexible printing plates on press cylinders.

In one form of printing process, printing is effected by photopolymer or rubber printing plates mounted on cylinders, the paper to be printed being impressed on the inked printing plate. The cylinder on which the printing plates are mounted is generally called the plate or printing cylinder. The quality of a printing job depends, in a large measure, on the care in which pre-press preparations are carried out. Plate mounting, color registration and proofing are effected off the press by means of commercially available mounting proofing machines designed for this purpose.

The mounting of photopolymer or other printing plates onto plate cylinders for printing therefrom requires a high degree of accuracy in the alignment thereof. The image must be square and in register on the cylinder in order to print square and in register on the work In the printing of colors or in the superimpression of images, the various colors or images are added sequentially. Accordingly, it is important that in each case the printing plate which is adding the successive color or image be synchronized with the preceding plate or plates so that the colors or images are accurately superimposed. To arrange these plates in the exact predetermined relation to one another requires that their angular as well as their transverse position on the printing plate support means be accurately determined In the prior art this synchronizing has been performed by mechanical methods and apparatus which are complicated in their implementation and easily subject to inaccuracies In addition, in the past the synchronizing of the printing plates has been done while they were in position in the printing press. This is not only inconvenient and presents difficult working conditions, but also the printing press is out of operation during this time.

One common method to effect the alignment of the plates with respect to the print cylinder involves the drawing of a line around the print cylinder. This line is then aligned by eye with a longitudinal line along the length of the photopolymer or other print plate. This method is relatively accurate but can be extremely time consuming for the operator. This leads to delay between print runs and is costly with respect to the time lost between such runs.

Alternatively, there is commercially available a device to aid in the alignment of photopolymer or printing plates onto the print cylinder. The print cylinder is placed in a fixed relationship to the device and the plate is laid upside down on a clear glass top. By means of a series of mirrors having lines drawn thereon, the plate is aligned relative to the print cylinder. However, this device is also relatively time consuming and the required accuracy is not achieved. There is only a one-to-one relationship between the eye of the operator and the device assisting in the alignment which can lead to errors of up to one millimeter. These errors are unacceptable where accurate printing is required. This device is generally only acceptable for the alignment of printing plates with respect to one another rather than with respect to the print cylinder.

These machines, which usually make use of an optical mounting system, make it possible to mount the plates on plate cylinders to effect exact color registration, a procedure essential to the maintenance of both quality and economy in all flexible plate printing operations. Preproofing is, in many respects, the most important of all prepress preparations, for it not only indicates the appearance of the final reproduction, but it also affords means to check the mounting of the plates for color sequence, spacing requirements, layout and gear size, as well as copy and color separation.

Mounting-proofing machines have been provided with a proofing cylinder (sometimes called the impression cylinder) which cooperates with the printing cylinder, the proofing cylinder making contact with the printing plates on the printing cylinder and rotating concurrently therewith to print a proof on a sheet secured to the proofing cylinder. In commercial machines of the type heretofore known which make use of optical mounting techniques, the proofing or impression cylinder is supported for rotation in a fixed position, whereas the printing cylinder is moveable, usually in a vertical direction, from a mounting state in which it is retracted relative to the proofing cylinder to a proofing state in which it is in engagement therewith.

The proofing and printing cylinders are mechanically intercoupled, whereby rotation of the proofing cylinder causes the printing cylinder to rotate. When the diameter of the proofing cylinder is the same as the printing diameter of the printing cylinder (i.e., the diameter of the printing cylinder plus the thickness of the printing plates thereon), then a one to one relationship exists therebetween. However, printing cylinders are manufactured in a range of diameters for printing different print lengths. Therefore, it has been necessary to adjust the phase relationship between the printing and proofing cylinders to accommodate the differences between the cylinder diameters. For adjusting this phase relationship for different printing cylinder diameters, a relatively complex mechanism is required in existing types of mounting-proofing machines.

Another drawback of existing types of mounting-proofing machines is their limited capacity to handle printing cylinders of different diameter. With machines of the type heretofore known, the capacity of the machine is restricted to a range of printing cylinder diameters extending from about ninety-five percent of the diameter of the proofing cylinder down to about twenty-five or thirty percent thereof, or approximately four to one, Moreover, since in existing structures, the proof forces imposed at contact are eccentrically opposed, the structures required to accommodate these magnified forces are too large to permit smaller sizes of printing cylinders to fit the machine.

SUMMARY OF THE INVENTION

The present invention concerns an apparatus for mounting and proofing flexible printing plates to an accuracy of plus or minus 0.002 inches along the width and circumference of a printing cylinder. The apparatus mounts the plates on a printing cylinder which is rotatably supported in a predetermined position. An adjacent support table has a surface for supporting a flexible printing plate having a reference point thereon. Actuators move the support table along three orthogonal axes one of which is parallel to the longitudinal axis of the printing cylinder. The position of the reference point is sensed by a video camera and feedback signals representing the positions of the camera and the table with respect to the three axes are inputs to a computer.

The computer determines the positional relationship between the reference point on the printing plate and the predetermined position of the printing cylinder and moves the support table to position the printing plate at a desired position for mounting on the printing cylinder. Each of the actuators includes a drive motor and a motor driver connected between the associated drive motor and the computer. A feedback generator is connected between the drive motor and its associated motor driver for generating the feedback signals to the computer.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
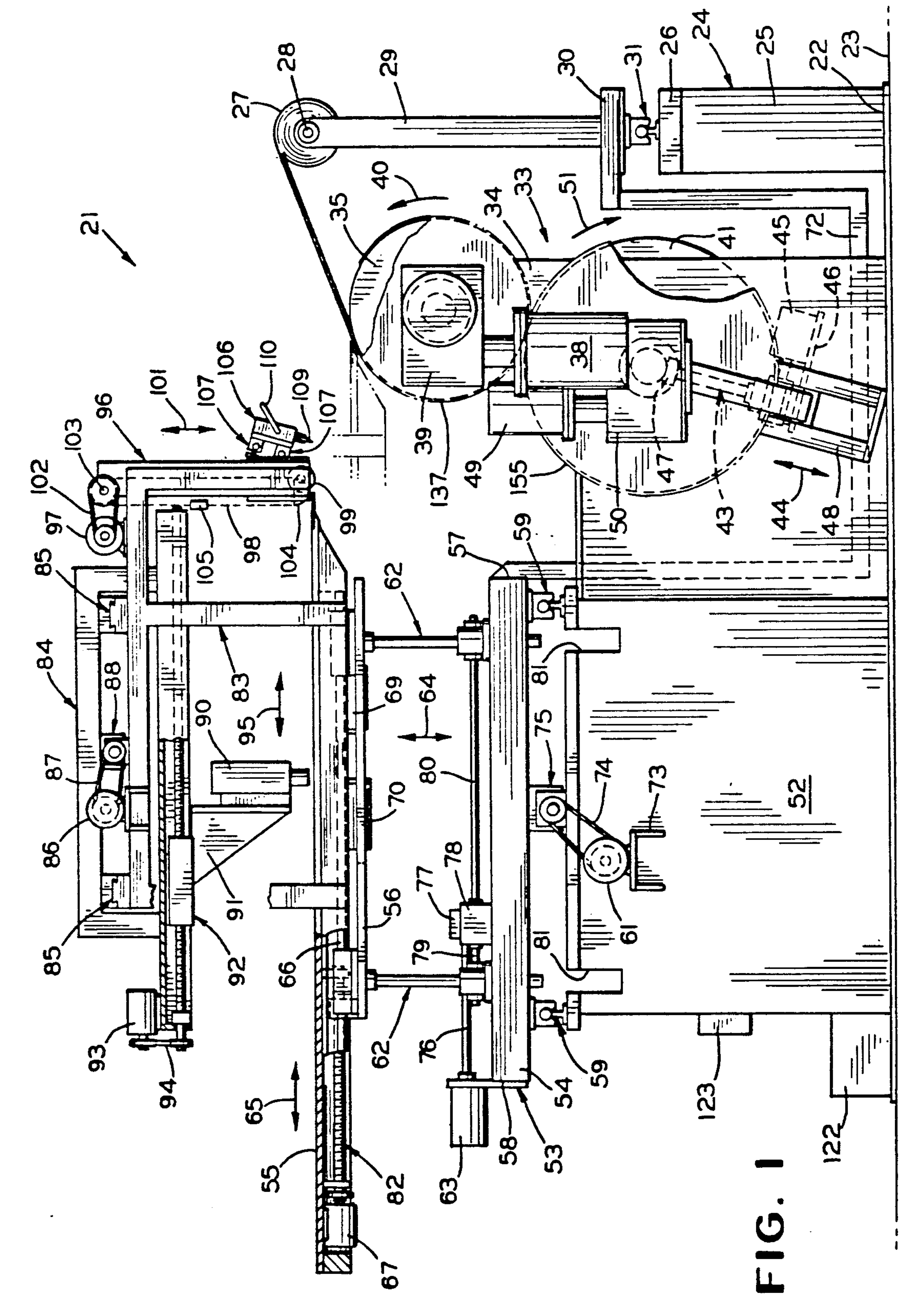
FIG. 1 is a left side elevational view of a mounting and proofing apparatus in accordance with the present invention.
Figure 2:
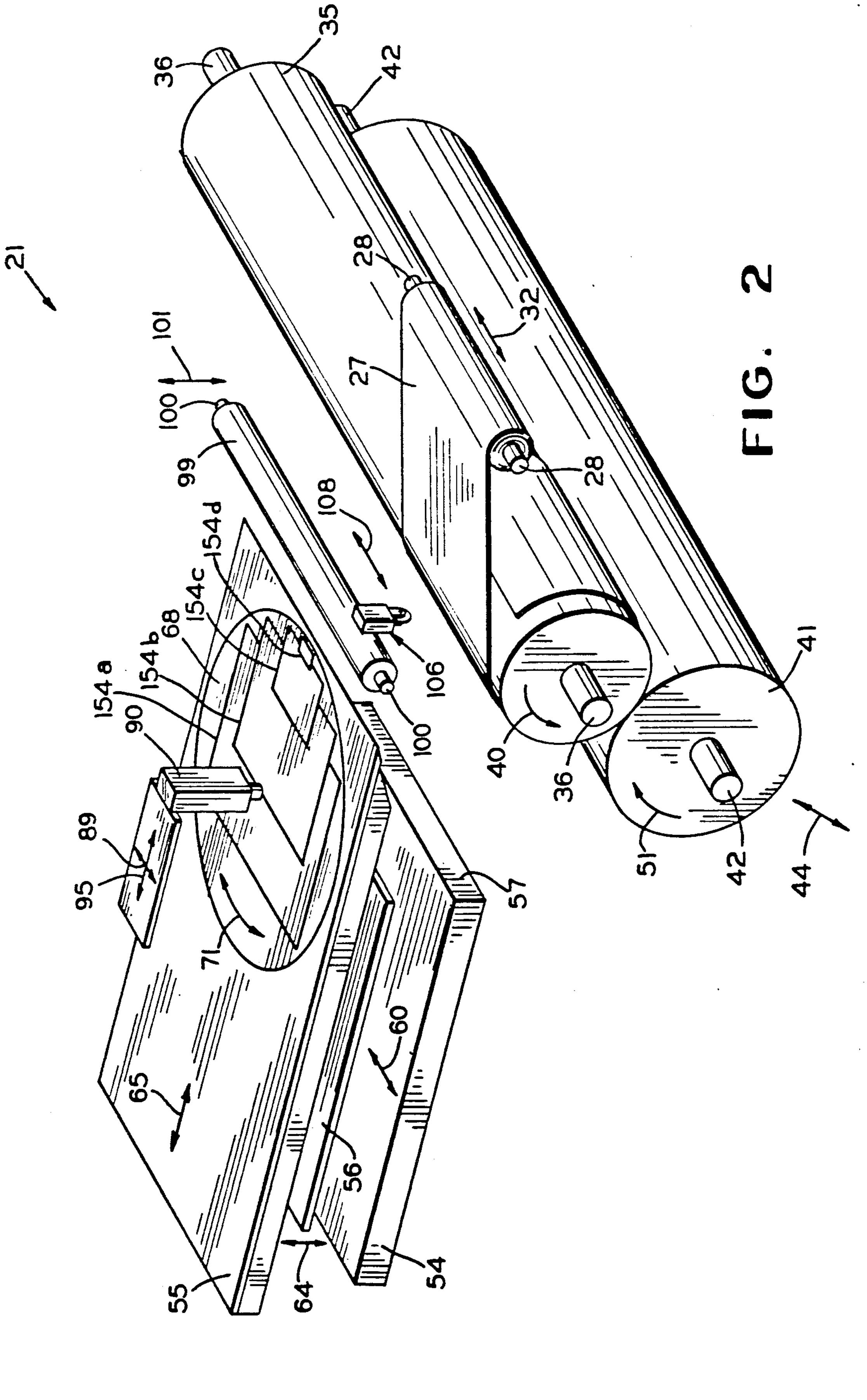
FIG. 2 is schematic perspective view of the apparatus shown in FIG. 1.

Referring to FIGS. 1 and 2, there is shown a mounting and proofing apparatus 21 for aligning and mounting flexible printing plates on printing cylinders for use on flexographic or rotary presses. As shown in FIG. 1, the apparatus 21 includes a generally horizontally extending base 22 adapted to be mounted on a solid surface such as a building floor 23. A first support 24 is positioned at the front of the apparatus 21 and includes a pair of generally vertically extending legs 24 (only one is shown) positioned at opposite sides of the apparatus 21. A track plate 26 is supported on the upper ends of the legs 24 and extends across the front of the apparatus 21 supporting a roll of mounting paper 27 which has adhesive on both sides thereof.

Referring to FIGS. 1 and 2, the mounting paper 27 is wound about a mounting paper roller 28 which roller is rotatably supported at its ends on the upper ends of a pair of spaced apart, generally vertically extending support posts 29 only one of which is shown in FIG. 1. The lower ends of the posts 29 are attached to the upper surface of a generally horizontally extending support plate 30. The support plate 30 is slidably mounted on a track or rail 31 such as a Thompson bearing which in turn is attached to an upper surface of the track plate 26. The rail 31 limits movement of the rolled paper 27 to an "X" axis of the apparatus 21 which axis extends generally perpendicular to the plane of FIG. 1. Thus, the roll of mounting paper 27, together with the roller 28, the support posts 29 and the support plate 30 are free to move back and forth along the "X" axis at the front of the apparatus 21 as shown by an arrow 32 in FIG. 2.

Figure 3:
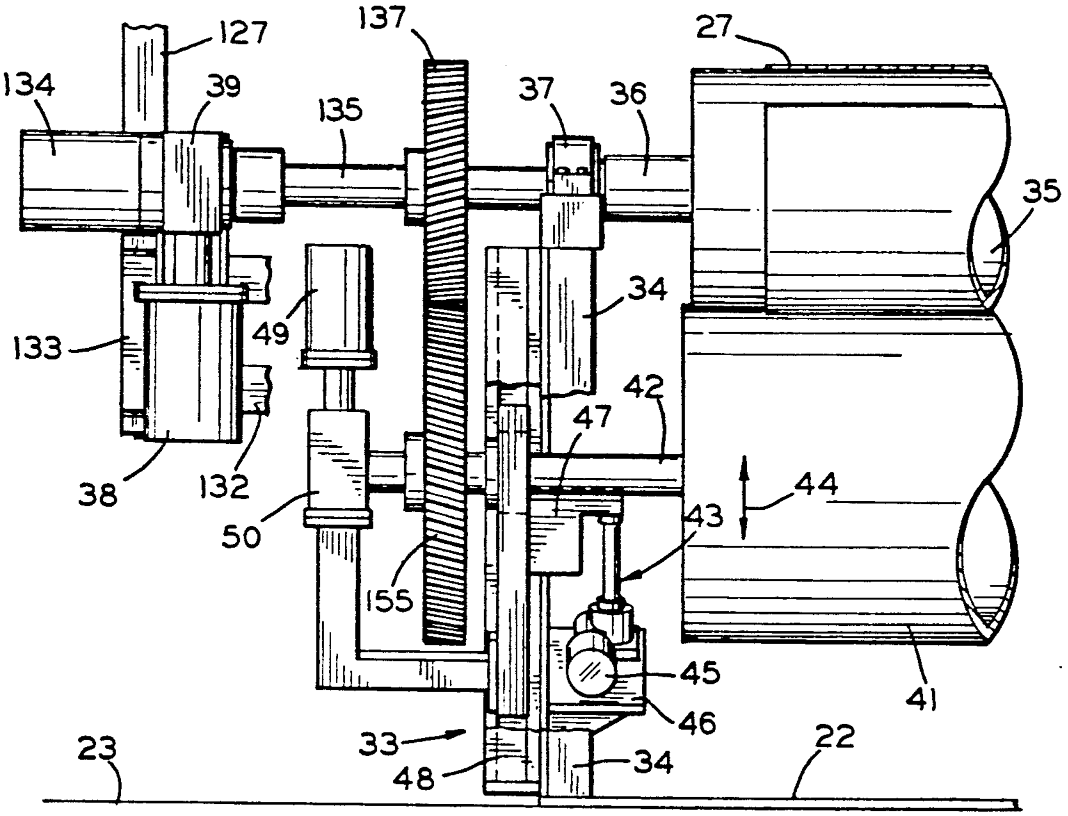
FIG. 3 is a front side fragmentary elevational view of the cylinder supporting portion of the apparatus shown in FIG. 1.

As shown in FIGS. 1 through 3, a second support 33 is mounted on the base 22 and is positioned behind (to the left in FIG. 1) of the first support 24. The second support 33 includes a pair of generally vertically extending spaced apart support posts 34 (only one of which is shown in FIGS. 1 and 3) positioned at opposite sides of the base 22. A printing cylinder 35, upon which plates are to be mounted, is rotatably supported by an axle 36 the ends of which are retained in a pair of bearing blocks 37 (one is shown in FIG. 3) attached to upper ends of the support posts 34. A printing cylinder drive motor 38 is coupled to the axle 36 through an anti-backlash gearbox 39, as explained below, for rotating the printing cylinder 35 in the direction shown by an arrow 40 in FIG. 2. The longitudinal axis of the printing cylinder 35 extends generally parallel to the "X" axis of the apparatus 21 and, thus, the printing cylinder is rotatably supported in a predetermined position on the base 22.

A proofing cylinder 41 is rotatably mounted by an axle 42 below and slightly behind (to the left in FIG. 1) the printing cylinder 35. The axle 42 is supported by a lifting means including a pair of jacks 43 attached to the inner sides of each of the support posts 34 for movement toward and away from the press cylinder 35 as shown by an arrow 44. Each of the jacks 43 has a drive motor 45 for actuating the jack and is mounted at a lower end on a support plate 46 attached to the inner side wall of the support post 34. An upper end of the jack 43 is attached to a support block 47 which retains the axle 42. The axle 42 and the support 47 extend through a slot formed in the support post 34 and are slidably movable in the direction of the arrow 44 in a slotted guide 48 attached to an outer surface of the post 34 A proofing cylinder drive motor 49 is coupled to the axle 42 through a gearbox 50 for rotating the proofing cylinder 41 in the direction of an arrow 51.

As shown in FIGS. 1 and 2, mounted on the base 22 and positioned behind (to the left in FIG. 1) the second support 33 is a third support 52. Mounted on an upper surface of the third support 52 is a generally rectangular support table 53 including a lower plate 54, an upper plate 55 and an intermediate plate 56 positioned between the plates 54 and 55. If an edge of the lower plate 54 closer to the printing cylinder 35 is designated as a front edge 57, the lower plate is supported adjacent its front edge 57 and a rear edge 58 for sliding movement along a pair of spaced apart tracks 59 attached to the upper surface of the third support 52. The tracks 59 are similar to the track 31 whereby movement of the lower plate 54 relative to the support 52 is limited to the "X" axis direction as shown by an arrow 41 in FIG. 2. Such movement can be accomplished by any suitable actuator coupled between the third support 52 and the lower plate 54 such as an "X" axis table motor 61 driving a ball screw as described below.

The intermediate plate 56 is supported above an upper surface of the lower plate 54 by four screw jacks 62 having upper ends attached at each of the corners of the intermediate plate and lower ends attached to the lower plate. The screw jacks 62 are coupled to a "Z" axis table motor 63 mounted on the rear edge 58 of the lower plate 54. The motor 63 raises and lowers the intermediate plate 56 in the direction of an arrow 64 designating a generally vertical "Z" axis of the apparatus 21.

The upper plate 55 provides movement in a "Y" axis direction, a generally horizontal direction in the plane of FIG. 1 as shown by an arrow 65. The upper plate 55 is mounted for sliding movement on a pair of tracks 66, similar to the tracks 31 and 59, attached to an upper surface of the intermediate plate 56. A "Y" axis table motor 67 is attached to and below the upper plate 55 and is coupled to a ball screw drive as described below for moving the upper plate 55 in the direction of the arrow 65. Thus, the support table 53 can be moved relative to the third support 52 and to the printing cylinder 21 along the "X" axis by the lower plate 54, along the "Y" axis by the upper plate 55 and along the "Z" axis by the intermediate plate 56.

Figure 4:
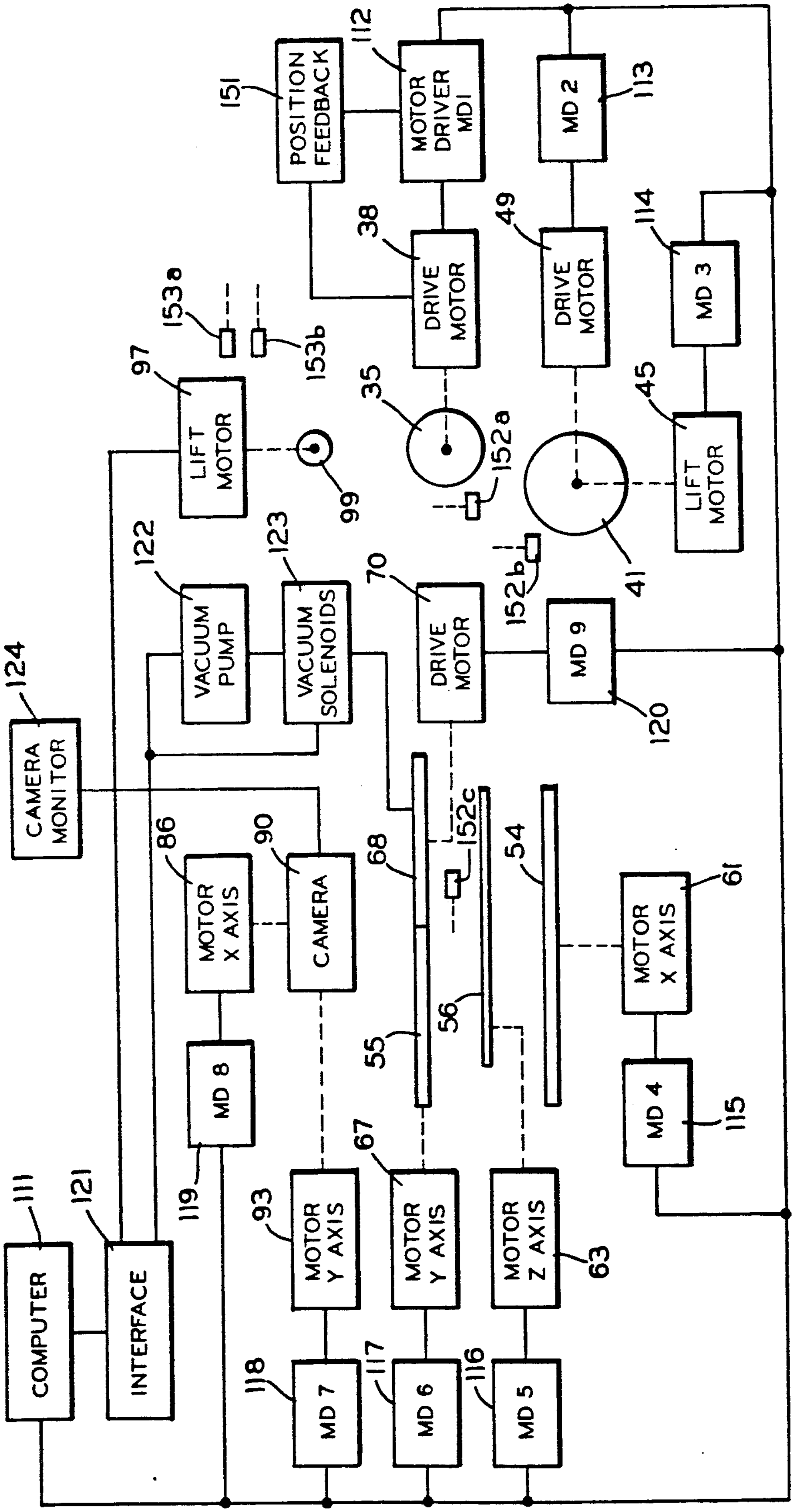
FIG. 4 is a schematic block diagram of the control system for the apparatus shown in FIG. 1.

As shown in FIGS. 2 and 4, a generally circular turntable or rotating plate 68 is mounted in an aperture formed in a front portion of the upper plate 55. The turntable 68 is attached to an output shaft of an anti-backlash gearbox 69 having an input shaft coupled to a turntable drive motor 70. The gearbox 69 and the drive motor 70 are mounted on an under surface of the upper plate 55 for rotating the turntable 68 about its central axis in a direction of an arrow as shown in FIG. 2. The turntable includes means for retaining a printing plate as will be described in more detail below.

As shown in FIG. 1, the support plate 30 is attached to an upper end of one leg of a generally U-shaped bracket 72. The bracket 72 extends between the support posts 34 and under the proofing cylinder 41 and an upper end of its other leg is attached to the front edge 57 of the lower plate 54. Thus, the mounting paper roll 27 is moved in unison with the support table 53 generally parallel to the longitudinal axis of the printing cylinder 35. Such movement is controlled by the motor 61 which is mounted on a bracket 73 attached to the third support 52. Any suitable means such as a belt or chain 74 can be utilized to couple an output shaft of the motor 61 to a threaded shaft of a ball screw drive 75. The threaded shaft can be rotatably supported on the upper surface of the support 52 and extend parallel to the rails 59 and threadably engages a block attached to the under surface of the lower plate 54. Thus, as the motor 61 rotates the shaft, the block and the lower plate 54 will be driven along the rails 59 in a direction determined by the direction of rotation of the motor 61. At the same time, the mounting paper roll 27 will be driven along the rail 31 to maintain its position with respect to the support table 53.

The drive motor 63 for the "Z" axis is coupled by a drive shaft 76 to a gearbox 77 having a pair of outputs and being mounted on an upper surface of the lower plate 54 The outputs (not shown) of the gearbox 77 are coupled by drive shafts (not shown) to a pair of gearboxes 78 (only one is shown) mounted on the upper surface of the lower plate 54 Each of the gearboxes 78 has a pair of outputs which are coupled to drive shafts 79 and 80 each of which is connected to an associated one of the screw jacks 62. Thus, the drive motor 63 drives the four screw jacks 62 in unison to either raise or lower the plates 55 and 56 depending upon the direction of rotation of the drive motor 63. The upper surface of the third support 52 has notches 81 formed therein to accept the lower ends of the threaded shafts of the screw jacks 62 when the plates 55 and 56 are lowered.

The "Y" axis table motor 67 operates in a manner similar to the "X" axis table motor 61. The motor 67 is coupled by any suitable means to a threaded shaft of a ball screw 82 mounted on the under surface of the upper plate 55. The threaded shaft is threadably engaged by a block which is attached to an upper surface of the intermediate plate 56. Thus, the drive motor 67 rotates the shaft of the ball screw which drives the upper plate 55 on the tracks 66 in a direction along the "Y" axis determined by the direction of rotation of the drive motor 67.

As shown in FIG. 1, attached to and extending upwardly from the upper plate 55 is a frame 83 for supporting a camera and a pressure roll. Mounted on the frame 83 is a camera carriage 84 which is supported on a pair of dovetail slides 85 mounted on an upper surface of the frame 83. Thus, the camera carriage 84 is moveable with respect to the frame 83 along the same "X" axis direction of movement as the support table 53. An "X" axis drive motor 86 is mounted on the frame 83 and can be coupled by a belt or chain 87 to drive a threaded shaft of a ball screw 88. The threaded shaft is rotatably mounted on the frame 83 and threadably engages a block attached to the carriage 84. The motor 86 drives the camera carriage 84 along the "X" axis as shown by an arrow 89 in FIG. 2 in a direction depending upon the direction of rotation of the motor 86.

A camera 90 is mounted on the carriage 84 and is directed downwardly toward an upper surface of the turntable 68. The camera 90 is attached to a bracket 91 which in turn is attached to an internally threaded block of a ball screw 92. The block threadably engages a threaded shaft of the ball screw 92 rotatably mounted on the under side of the camera carriage 84. Also mounted on the camera carriage 84 is a drive motor 93. The drive motor 93 is coupled to the threaded shaft of the ball screw 92 by a belt or chain 94 Thus, the drive motor 93 moves the camera 90 along the "Y" axis in the direction of an arrow 95 depending upon the direction of rotation of the drive motor 93.

Attached to a forward end of the frame 83 is a pressure roll and cutter support 96. A pressure roll lift motor 97 is mounted on the frame 83 and is coupled to drive a pair of spaced apart, generally vertically extending endless chains 98 (only one is shown). A pressure roll 99 is rotatably mounted by an axle 100 at opposite ends thereof to the chains 98. The pressure roll 99 can be raised and lowered in the direction of an arrow 101 depending upon the direction of rotation of the lift motor 97. For example, the motor 97 can be coupled by a belt or chain 102 to a drive axle 103 having a pair of sprockets (not shown) for engaging the upper ends of the chains 98. The lower ends of the chains 98 each can be guided by a non-metallic block 104 attached to the frame 83 and an overtravel spring 105 can be provided to connect opposite ends of each of the chains.

Also mounted on the pressure roll and cutter support 96 is a cutter device 106. The cutter device 106 is slidably mounted on a pair of rails 107 similar to the track 31. The rails 107 are connected to the chains 98 for movement in the direction of the arrow 101. However, the cutter device 106 is free to move along the rails 107 in the direction of the "X" axis as shown by an arrow 108 in FIG. 2. When the upper plate 55 is in the position shown in phantom adjacent the printing cylinder 35, the pressure roll 99 and the cutter device 106 can be lowered such that a cutter blade 109 engages the mounting paper 27. A handle 110 is provided on the cutter device 106 for manually moving the cutter blade 109 across the width of the mounting paper 27 to sever a section of the paper 27 which is being wrapped around the printing cylinder 35. The cutter device 106 can be rotated through an angle of approximately forty degrees in the plane of the "Y" and "Z" axes in order to align the cutter blade 109 along a radius of the printing cylinder 35. The cutter blade 109 can also be rotated ninety degrees to enable cutting along the longitudinal axis of the mounting paper 27 as the printing cylinder 35 rotates.

In FIG. 4, there is shown a schematic block diagram of the control system for the mounting and proofing apparatus 21. The control system includes a programmed general purpose computer 111 connected to control all of the actuators and other devices described above. Each of the previously described motors, except the lift motor 97, is connected to a separate motor driver to form an actuator. The computer 111 is connected to a motor driver (MD1) 112 which in turn is connected to the drive motor 38 for the printing cylinder 35. Thus, the computer 111 generates control signals to the motor driver 112 for controlling the rotation of the printing cylinder 35. Similarly, the computer 111 is connected to a motor driver (MD2) 113 which in turn is connected to the drive motor 49 for the proofing cylinder 41. The computer 111 generates control signals to the motor driver 113 to control the rotation of the proofing cylinder 41. The computer 111 is also connected to a motor driver (MD3) 114 which in turn is connected to the lift motor 45 for the proofing cylinder 41. The motor driver 114 and the lift motor 45 are representative of two such actuators, one for each end of the proofing cylinder 41.

The computer 111 also controls the movements of the support table 53. The computer 111 is connected to a motor driver (MD4) 115 which in turn is connected to the motor 61 which is coupled to the lower plate 54 for movement along the "X" axis. The computer 111 is connected to a motor driver (MD5) 116 which is turn is connected to the motor 63 which is coupled to the intermediate plate 56 for movement of the support table along the "Z" axis. The computer 111 is connected to a motor driver (MD6) 117 which in turn is connected to the motor 67 which is coupled to the upper plate 55 for movement of the support table along the "Y" axis Thus, the computer 111 control the three actuators for moving the support table along the three orthogonal axes.

The camera 90 is also positioned by the computer 111. The computer is connected to a motor driver (MD7) which is connected to the motor 93 which is coupled to the camera 90 for movement along the "Y" axis. The computer 111 is also connected to a motor driver (MD8) 119 which is connected to the motor 86 which is coupled to the camera 90 for movement along the "X" axis. The computer 111 is connected to a motor driver (MD9) 120 which is connected to the drive motor 70 for rotary movement of the turntable 68. By utilizing the registration marks on the printing plate, the computer controls the position of the turntable 68 to align the printing plate with the "X" and "Y" axes of the apparatus 21.

The computer 111 also controls the movement of the pressure roll 99. The computer 111 is connected through an interface 121 for generating control signals to determine the direction and duration of rotation of the lift motor 97. The computer 111 is also connected through the interface 121 to a vacuum pump 122 and a plurality of vacuum solenoids 123. The pump 122 and the solenoids 123 are mounted on the support 52 as shown in FIG. 1. The computer 111 turns on and off the vacuum pump 122 which supplies vacuum to the turntable 68 for holding the printing plates as will be described below The plurality of vacuum solenoids 123 are connected the vacuum pump 122 and the turntable 68 and are turned on and off by the computer 111 in accordance with the size and position of the printing plate on the turntable 68.

The camera 90 is conventional video camera which generates a visual display to a camera monitor 124. The camera 90 reproduces on the camera monitor 124 a representation of the upper surface of the printing plate area over which the camera is suspended. The camera 90 can be driven by the motors 86 and 93 across the surface of the printing plate until a registration mark is located. Information is generated back to the computer 111 as to the position of the camera 90, and thus the position of the registration mark, with respect to the upper surfaces of the upper plate 55 and the turntable 68. Through feedback, the computer 111 also knows the position of the support table with respect to the three orthogonal axes.

Figure 5:
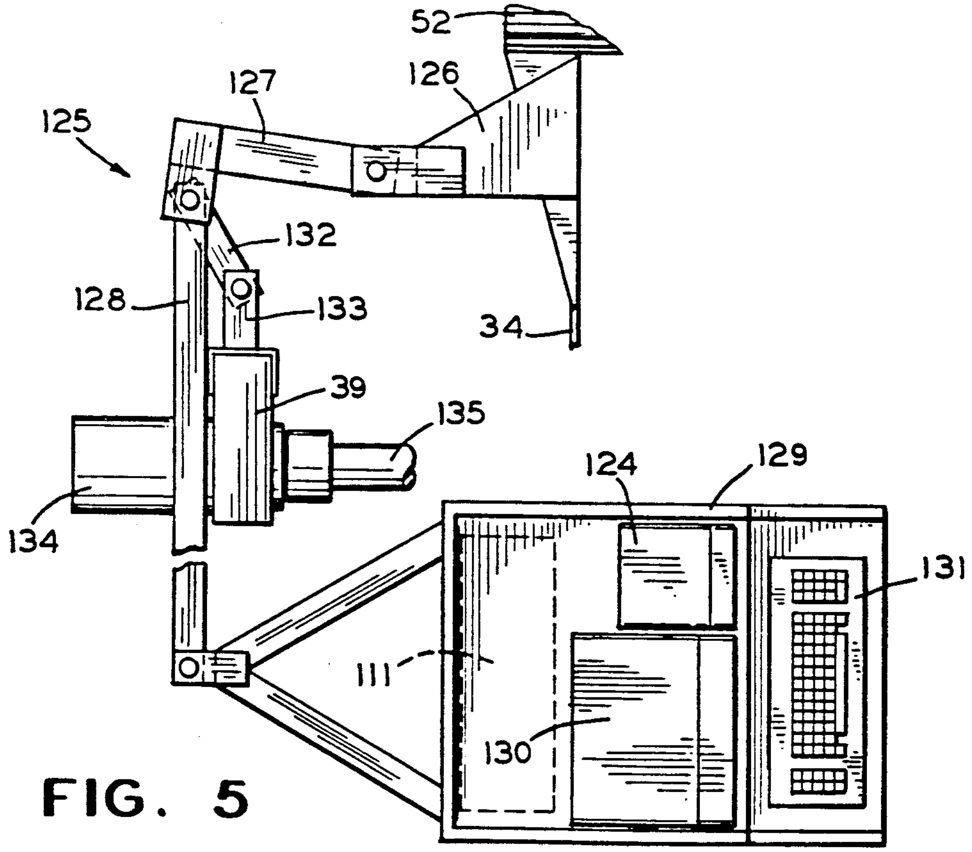
FIG. 5 is a fragmentary top plan view of a support frame for a printing cylinder drive, a computer° and a camera monitor for use with the apparatus shown in FIG. 1.
Figure 7:
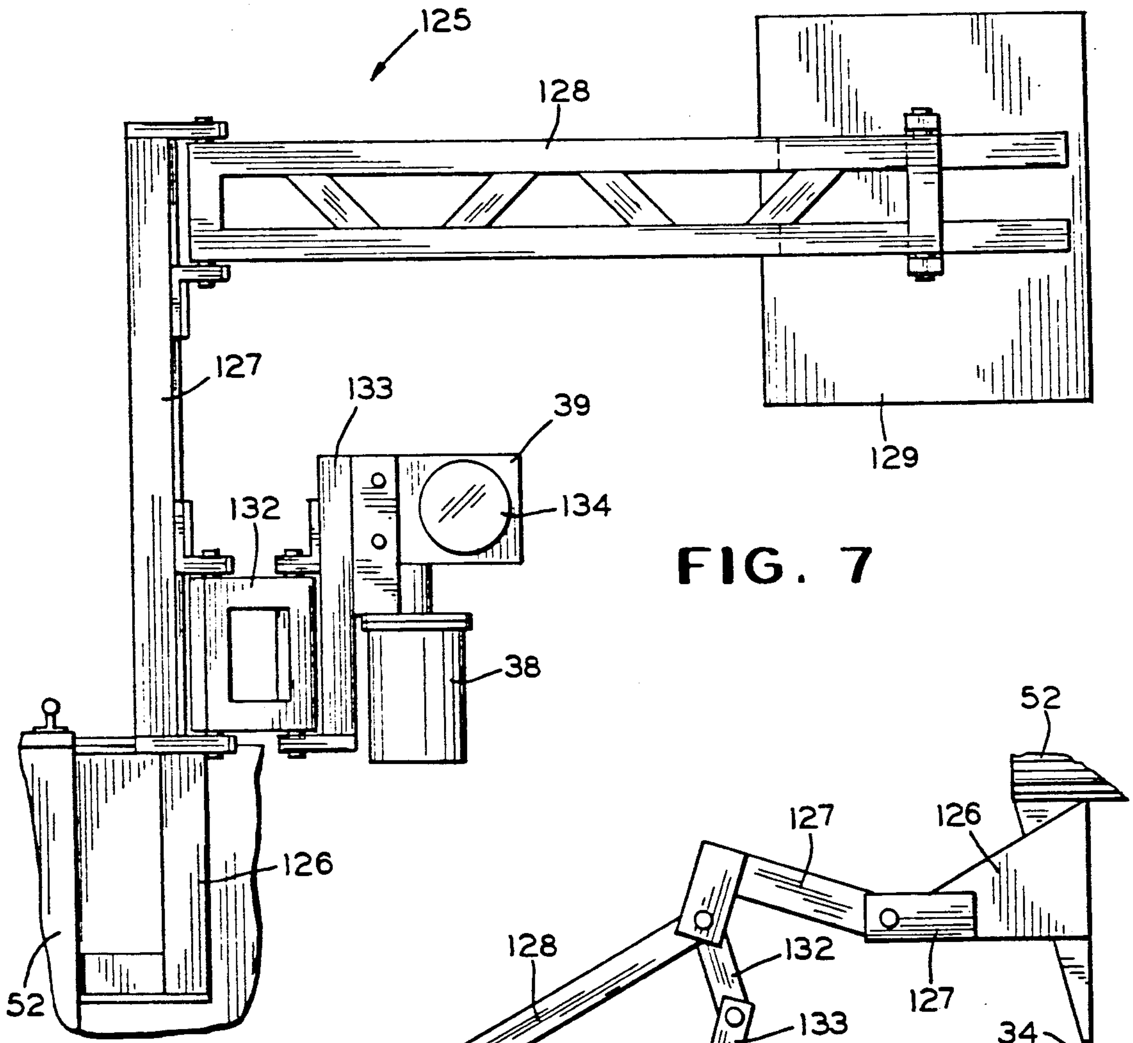
FIG. 7 is a fragmentary side elevational view of the support frame shown in FIG. 5.
Figure 6:
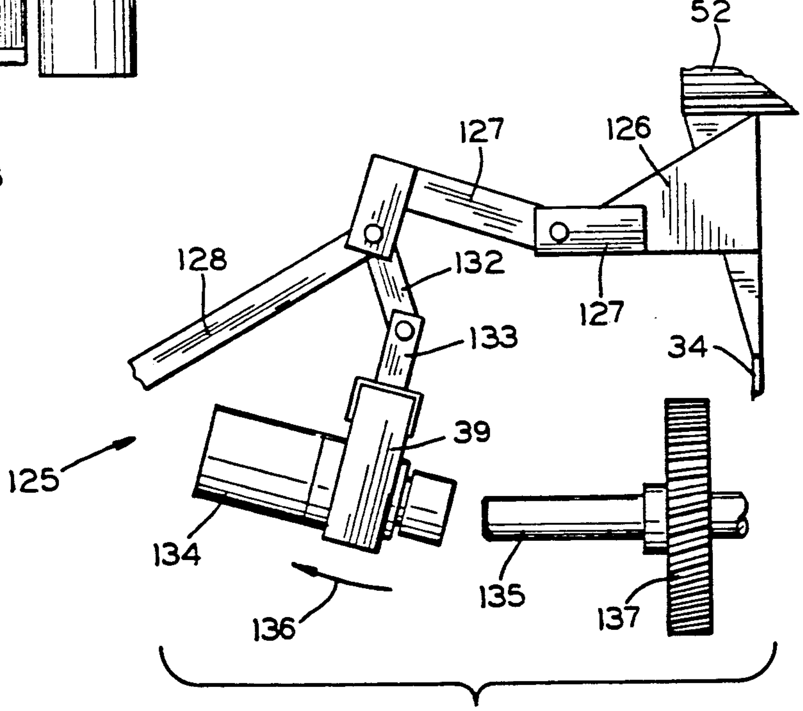
FIG. 6 is a view similar to FIG. 5 with the support frame and the printing cylinder drive shown in a detached position.

FIGS. 5 through 7 illustrate a support frame for the printing cylinder drive, the computer 111 and the camera monitor 124. A portion of each of the support posts 34 extends rearwardly and attaches to a front edge of the third support 52. A support bracket 126 is attached to and extends outwardly from a generally vertically extending outer wall of the support post 34 adjacent the printing cylinder drive motor 38 and the gear box 39. A lower end of a generally vertically extending post 127 is attached to the support bracket 126. The lower end of the post 127 is pivotally attached to the support bracket 126 and extends outwardly and upwardly. One end of a generally horizontally extending arm 128 is pivotally attached to an upper end of the post 127. A computer and camera monitor housing 129 is pivotally attached to an opposite end of the arm 128. As shown in FIG. 5, the housing 129 supports a monitor 130 for the computer 111, the camera monitor 124, the computer 111 and a keyboard 131 for the computer 111. The pivotal connections between the support bracket 126 and the post 127, between the post 127 and the arm 128, and between the arm 128 and the housing 129 permit the housing 130 to be pivoted toward the rear of the apparatus 21 when the printing cylinder 135 is being changed or during any other manual operation.

A relatively short arm 132 is pivotally connected between a lower end of the post 127 and a mounting bracket 133. The anti-backlash gearbox 39 is attached to the mounting bracket 133 and mounted on the gearbox 39 is an actuator 134. The actuator 134 operates a coupling for connecting and disconnecting an output of the gearbox 39 to a drive shaft 135. When the actuator 134 uncouples the gearbox 39 from the drive shaft 135, the drive motor 38, the gearbox 39 and the actuator 134 can be pivoted away from the drive shaft 135 in the direction of an arrow 136 shown in FIG. 6 The uncoupling of the gearbox 39 permits the changing of a gear 137 mounted on the drive shaft 135 or the removal of the printing cylinder 35 from the apparatus 21.

Figure 8:
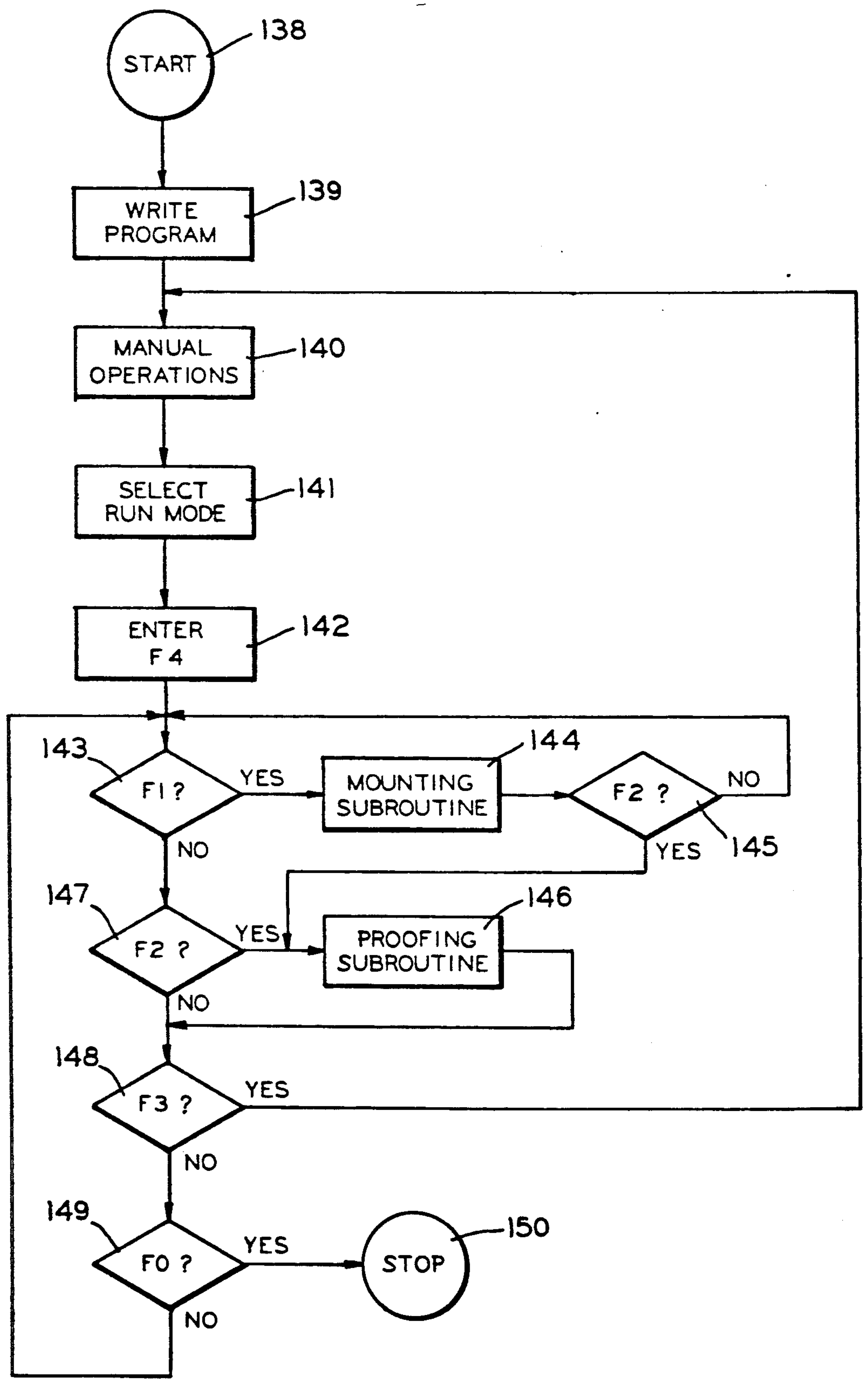
FIG. 8 is a flow diagram of the operation of the mounting and proofing apparatus according to the present invention.

The operation of the mounting and proofing apparatus 21 will now be described in connection with a flow diagram shown in FIG. 8. The operation begins at a circle START 138. The operator executes an instruction set WRITE PROGRAM 139 wherein various variables are designed in a job file as follows:

WRITE PROGRAM

1. Name the job (Leader).
2. Describe the job (2ACR-1ARD 4 color + varnish).
3. Select the cylinder (number of teeth).
4. Length of cylinder.
5. Plate Width, Plate Depth, Ref 1x, Ref 1y. Ref 2x, Ref 2y, Cyl x, Cyl y.

DEFINITIONS

A Plate Width (side to side) as operator stands on machine platform.
B. Plate Depth (in and out) as operator stands on machine platform.
C. Ref 1x = First register point location on "X" axis.
D. Ref 1y = First register point location on "Y" axis.
E. Ref 2x = Second register point location on "X" axis.
F. Ref 2y = Second register point location on "Y" axis.
G. Cyl x = Plate center point left or right off center point of cylinder.
H. Cyl y = Plate center point around cylinder off center point of cylinder.
I. Plate thickness.
J. Backing thickness.

Next the operator enters an instruction set MANUAL OPERATIONS 140 wherein the following steps are performed:

MACHINE OPERATION

1. Turn on power (pull switch). Push start switch.
2. Allow computer to boot-up.
3. Type in "Operator".
4. Follow screen instructions.
5. Select operation mode.
6. Manually
   a) Locate table right of center
   b) Locate camera left-front.
   c) Locate table to back.
   d) Unclamp.
7. Put substrate on proofing cylinder securely.
8. Place printing cylinder into lower bearing housing holders.
9. Move gear on shaft so the gear rub plate can be installed. Install the gear rub plate.
10. Push the gear against the rub plate.
11. Install the cylinder squeeze collar against the gear and tighten (2) squeeze screws Tighten (4) set screws uniformly so the cylinder cannot be moved. Loosen (4) set screws 1/16 of turn uniformly.
12. Install gripping collar securely.
13. Swing controls and printing cylinder drive to front. place control in mount position (left of platform rail collar).
14. Slide gripping collet on cylinder shaft.
15. Clean cylinder surface.
16. Apply adhesive.
17. Remove paper.
18. Check for air bubbles, gaps and/or overlays. Make the necessary adjustments. Check that the camera is in left-front and table is to the right of the center line.
19. Quit from manual mode. The operator executes an instruction set SELECT RUN MODE 141 wherein the following steps are performed:
20. Select run mode. Type job selection name (Leader). Type security code.
21. Select the plates to be mounted. The operator then executes an instruction set ENTER F4142 wherein the following steps are performed:
22. Hit the F4 key to home the unit.
    a) The machine checks to see if the cylinder is correct, sends the camera home, table-up home, table side to side home, then camera over rotating plate center point.
    b) Raises proofing cylinder to proximity hole position.
    c) Homes proofing cylinder and printing cylinder.
    d) Unclamps collet, meshes gears. clamps collet (times printing cylinder and proofing cylinder together), proofing cylinder lowers to proximity hole position.

The operator now has the option to mount a plate, proof a plate already mounted, enter the manual mode or quit the job. The computer program enters a decision point 143 wherein a check is made to see if the F1 key has been pressed. If the F1 key has been pressed, the program exits at "YES" and enters an instruction set MOUNTING SUBROUTINE 144. The computer then performs the following instructions:

To mount, hit F1
Move table down.
Move table ahead.
Hit F1 to continue.
Hit F1 for auto seek (camera locates approximate register point position).
Place plates on table (approximately 1 ½ right of square and 2" off front).
Place register point hold down bar behind points.
Hit F1; vacuum comes on.
Hit F1: camera goes to approximate location of first point.
Place camera over first register point.
Hit Esc.; camera automatically goes for second point.
Place the camera over the second point.
Hit Esc. and any key or Esc. twice.
Any key will move the camera over second point after rotation.
Any key again; camera goes to first register point.
Hit Esc.; camera goes to home.
Hit Esc.; printing cylinder rotates to mount position.
Hit Esc.; table moves left to right to mount position.
Hit F1 plus any key.
Hit F1; pressure roll lowers pressing printing plate to adhesive.
Hit F1; printing cylinder rotates to mount plate.
*Remove hold down bar before it gets to pressure roll.*
Hit any key twice. This raises the pressure roll.
Continue until all selected plates are mounted.

After the mounting subroutine is complete, the computer checks at a decision point 145 for the actuation of the F2 key. If the F2 key has not been pressed, the program branches from the decision point 145 at "NO" back to the decision point 143. If the F2 key has been pressed indicating that proofing is desired, the program branches from the decision point 145 at "YES" to an instruction set PROOFING SUBROUTINE 146. The instruction set 146 is also entered if the F1 key has not been actuated at the decision point 143. The program branches from the decision point 143 at "NO" and enters a decision point 147 which checks for the actuation of the F2 key. If the F2 key has been actuated. the program branches at "YES" to the instruction set 146.

The instruction set 146 executes the following instructions:

Hit F2 when complete to proof.

Ink cylinder (goes in proofing direction only).

Hit Esc. when complete. (Proofer and cylinder will home for correct tooth mesh.)

Hit F1 to continue.

Proofer rises.

Hit F1 to proof. (If more pressure is required, F9then read screen for side needing more.)

Use ink key to clean off plates, if desired.

Hit Esc. or reset (if wanting to re-proof).

When the proofing subroutine 146 is complete, the program enters a decision point 148 to check for actuation of the F3 key. If the F2 key has not been actuated at the decision point 147, the program will branch at "NO" to the decision point 148. If the F3 key has been actuated, the program will branch from the decision point 148 at "YES" and return to the instruction set 140 for manual operation of the apparatus 21. If the F3 key has not been actuated, the program will branch from the decision point 148 at "NO" to a decision point 149. If the F0 key has been actuated, the program will branch from the decision point 149 at "YES" and enter a circle STOP 150. The computer program is now complete and the following manual operations are performed:

Back to main menu.

Select unclamp.

Select quit.

Hit enter.

Type "Operator".

Lower printing cylinder to home.

Remove printing cylinder. Remove squeeze clamp, spacers, and top bearing caps.

If the F0 key has not been actuated, the program will branch from the decision point 149 at "NO" and return to the decision point 143.

Each of the motors shown in FIG. 4, with the exception of the lift motor 97 is connected to a separate feedback position generator for indicating to the computer 111 the position of the associated portion of the apparatus 21 being moved by the motor. For example, a position feedback generator 151 is connected between the drive motor 38 and the motor driver 112. The feedback position generator 151 senses the rotational position of the output shaft of the drive motor 38 and generates a feedback signal representing that position to the motor driver 112. The motor driver 112 generates the feedback signal to the computer 111 such that the computer 111 is constantly updated as to the rotational position of the printing cylinder 35. A similar feedback generator is connected between each of the motors 45, 49, 61, 63, 67, 70. 86 and 93 and their associated motor drivers. Thus, the computer 111 receives feedback signals indicating the rotational position of the proofing cylinder 41, the position of the support table 53 along each of the "X", "Y", and "Z" axes, the rotational position of the turntable 68 and the position of the camera 90 along the "X" and "Y" axes.

Also shown in FIG. 4 are homing switches 152*a*, 152*b* and 152*c*. The homing switch 152*a* is positioned adjacent the printing cylinder 35 and is connected to generate a signal to the computer 111 indicating a predetermined rotational orientation of the printing cylinder. This signal can be utilized rotate the cylinder to a "home" position and to check the feedback signal from the position feedback generator 151. The homing switch 152*b* is positioned adjacent the proofing cylinder 41 and performs a function similar to the switch 152*a*. The homing switch 152*c* is positioned adjacent the shaft (not shown) coupling the output of the gear box 69 with the turntable 68 for performing a function similar to the switch 152*a*.

Also shown in FIG. 4 are a pair of end of travel switches 153*a* and 153*b*. The switches 153*a* and 153*b* are located at opposite ends of the path of travel of the pressure roll 99. If the pressure roll 99 is driven to the end of its path of travel and engages one of the switches 153*a* and 153*b*, a signal is generated to the computer 111 to indicate that the lift motor 97 is to be turned off in order to protect the pressure roll drive apparatus from damage. Although not shown, similar pairs of switches can be utilized with each of the motors for the support table 53 and each of the motors for the camber 90.

Referring to FIGS. 2 and 4, the vacuum pump 122 is connected through vacuum solenoids 123 to a plurality of grooves 154*a* through 154*d* formed in an upper surface of the turntable 68. The grooves 154*a* through 154*d* represent a plurality of different size printing plates. When a printing plate is placed on the upper surface of the turntable 68, the vacuum solenoids 123 are actuated. The computer 111 has stored the information as to the size of the printing plate as entered by the operator and actuates the solenoids 123 associated with the ones of the grooves 154*a* through 154 *d* which are covered by the printing plate. Thus, the vacuum pump 122 and the ones of the vacuum solenoids 123 that are actuated apply a vacuum to the covered ones of the grooves 154*a* through 154*d* thereby firmly holding the printing plate on the upper surface of the turntable 68.

During proofing, rotating the inked printing plate on the printing cylinder against the proofing cylinder, the gear 137 shown in FIG. 3 meshes with a gear 155 attached to the proofing cylinder axle 42 to rotate the proofing cylinder 41 and print on a substrate. Although the motor 38 could drive both cylinders, the computer 111 can also control the motor 49 to drive the proofing cylinder in synchronism.

In accordance with the provisions of the patent statutes, the present invention has been described in what is considered to represent its preferred embodiment. However, it should be noted that the invention can be practiced otherwise than as specifically illustrated and described without departing from it spirit or scope.

What is claimed is:

1. An apparatus for mounting flexible printing plates on a printing cylinder comprising:

means for rotatably supporting a printing cylinder in a predetermined position;

a support table adjacent said means for rotatably supporting and having a surface for supporting a flexible printing plate having a reference point thereon;

means for moving coupled to at least one of said support table and said means for rotatably supporting for moving said one along at least two of three orthogonal axes;

means for sensing mounted on said support table for generating a signal representing an area of said support table surface and for sensing the position of a reference point on a printing plate mounted on said support table;

actuator means attached to said support table and coupled to said means for sensing for moving said means for sensing adjacent the reference point on the printing plate; and control means connected to and responsive to said means for sensing for determining the positional relationship between the reference point on the printing plate and the predetermined position of the printing cylinder, and said control means connected to said means for moving for positioning the printing plate at a desired position along said orthogonal axes relative to the printing cylinder.

2. An apparatus for mounting flexible printing plates on a printing cylinder comprising:

means for rotatably supporting a printing cylinder in a predetermined position;

a support table adjacent said means for rotatably supporting and having a surface for supporting a flexible printing plate having a reference point thereon;

means for moving coupled to at lest one of said support table and said means for rotatably supporting for moving said one along at lest two of three orthogonal axes;

means for sensing mounted on said support table and connected to said means for moving for sensing the position of a reference point on a printing plate mounted on said support table and for generating a signal representing the position of the support table along the three axes; and control means connected to and responsive to said means for sensing for determining the positional relationship between the reference point on the printing plate and the predetermined position of the printing cylinder, and said control means connected to said means for moving for positioning the printing plate at a desired position along said orthogonal axes relative to the printing cylinder.

3. An apparatus for mounting flexible printing plates on a printing cylinder comprising:

a ground engaging base;

a support table, including a turntable formed therein for supporting a printing plate, mounted on said base for movement along three orthogonal axes referenced to said base;

three support table actuator means attached to said support table for moving said support table along said three orthogonal axes and for generating a first position signal representing the position of said support table with respect to said three axes;

means for rotatable supporting a printing cylinder on said base;

means for sensing mounted on said support table for sensing the position of a printing plate supported by an upper surface of said support table and for generating a second position signal representing said printing plate position on said support table;

two sensing actuator means attached to said means for sensing for moving said means for sensing along two of said three axes; and control means connected to said support table actuator means and said means for sensing and responsive to said first and second position signals for determining the positional relationship between the printing plate and said base for controlling said support table actuator means to move said support table to a desired position along said there axes for mounting the printing plate on the printing cylinder.

4. The apparatus according to claim 3 including an actuator coupled to said turntable for rotating said turntable about a central axis, said turntable actuator being connected to said control means for actuation thereby.

5. The apparatus according to claim 3 wherein said turntable has a plurality of grooves formed in an upper surface thereof, and including a vacuum pump connected to said grooves through a plurality of associated valves, said vacuum pump and said valves being connected to said control means for selectively controlling the application of a vacuum to each of said grooves.

* * * * *